Patented Nov. 3, 1931

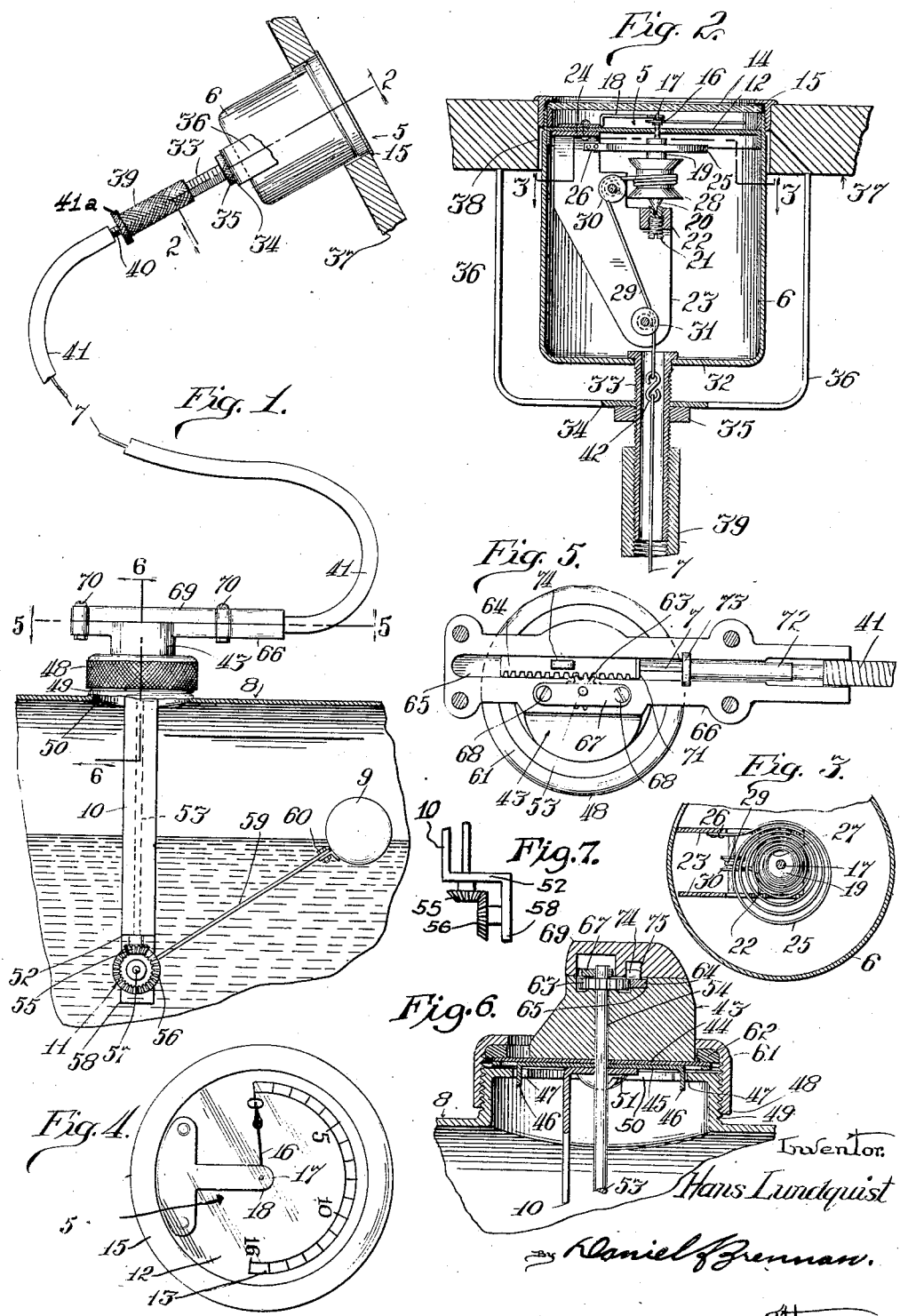

1,830,473

UNITED STATES PATENT OFFICE

HANS LUNDQUIST, OF CHICAGO, ILLINOIS, ASSIGNOR TO UNITED STATES SPECIALTY CORPORATION, OF CHICAGO, ILLINOIS, A CORPORATION OF ILLINOIS

LIQUID LEVEL INDICATOR

Application filed December 6, 1922. Serial No. 605,236.

This invention relates broadly to indicators, and more especially pertains to such indicators as are adapted to give a visual indication of liquid level in a tank or the like, at a point, for convenience, usually remote from the tank.

While this invention, for convenience, here is illustrated and described as a liquid level indicator, it will be readily understood that the invention is not limited to such purpose, and therefore finds a wide field of utility for other purposes.

The principal objects and advantages which characterize this invention reside in the provision of improved liquid level indicating apparatus; the provision of improved apparatus of the character described characterized by the embodiment therein of improved float actuated mechanism; the provision of an improved form of indicating device; the provision of an improved motion transmitting element; the provision of an improved combined float actuated mechanism, motion transmitting element, and indicating device; the provision of liquid level indicating apparatus characterized by the embodiment therein of improved adjusting means; the provision, in combination with a motion imparting element, and an indicator, of an improved adjustable motion transmitting means; the provision of an improved motion transmitting element characterized by the feature of lineal adjustability without disconnection from the elements to which it is attached; the provision, in combination with an indicator and improved motion imparting means, of an improved flexible and lineally adjustable motion transmitting element; and the provision, in combination, an improved indicator, an improved liquid level actuated element, and an improved flexible motion transmitting element, all characterized by the features of facile adjustability before and when installed, durability, simplicity, accuracy, and such device being so constructed to facilitate assembly and installation.

More specifically, this invention is further characterized by the provision of an improved float or liquid actuated mechanism, which may be readily applied to any liquid container or tank with little or no alterations, and the provision of an improved flexible cable for transmitting motion wherein the cable is constantly maintained under tension so that a break in the cable will give an indication to the observer of the indicator, and provision of an improved revolving indicator.

The foregoing and such other objects and advantages as may appear or be pointed out as this description proceeds are attained in one structural embodiment, illustrated in the accompanying drawings, in which:

Figure 1 is a fragmentary elevational view of the device of this invention;

Figure 2 is a longitudinal axial sectional view of the indicator, taken on line 2—2 of Figure 1, looking in the direction indicated by the arrows;

Figure 3 is a transverse sectional view taken on line 3—3 of Figure 2, looking in the direction indicated by the arrows;

Figure 4 is an end elevational view of the indicator;

Figure 5 is a horizontal sectional view taken on line 5—5 of Figure 1, looking in the direction indicated by the arrows;

Figure 6 is a fragmentary vertical sectional view taken on line 6—6 of Figure 1, looking in the direction indicated by the arrows; and Fig. 7 is an elevational view of a detail.

Referring more particularly to the drawings, the device of this invention conveniently comprises generally, the indicating element 5, including a casing 6, the motion transmitting element 7, conveniently a flexible cable, and the motion imparting or actuating element, which in this instance is adapted for movement in response to changes in liquid level in a tank 8, and said actuating means conveniently comprising generally the float 9, support 10, and gearing 11.

The indicator comprises a supporting plate 12 fixedly secured near the outer end of the casing 6, said plate having a properly calibrated semi-circular scale 13 on its outer surface. A transparent plate 14 covers the plate 12 and is in spaced relation thereto, secured in position on the casing 6 by the provision of an annulus 15, which latter is conveniently threaded to the wall of the casing.

An indicating arm 16 is fixedly mounted on a revoluble shaft 17 which projects through the plate 12 and is journaled at one end in a bracket 18, fixedly secured to the plate 12, said arm 16 having its free end moving across the scale 13.

The shaft 17 forms the reduced extension of a shaft 19, which latter is arranged axially of the casing, said shaft 19 having its inner end pointed as at 20 to seat in a complemental recess provided in a set screw 21, which latter is threaded into a transverse shoulder 22 carried by the frame 23, said frame 23 being riveted or otherwise fixedly secured at 24 to the inner surface of the plate 12. A coiled spring 25 surrounds the shaft 19, one end of said coiled spring being fixedly connected at 26 to one side of the frame 23, and the other end of said coiled spring being fixedly connected at 27 to the shaft 19.

A drum 28 is fixedly secured to the shaft 19, or may be integrally formed therewith and to said drum there is secured one end of a short piece of cable 29, said cable being partly wound around the drum 28.

The short piece of cable 29 is trained over sheaves 30 and 31 journaled on shafts supported by the sides of the frame 23, the inner of said sheaves, that is, the sheave designated 31, being so arranged that the cable is brought into alignment with the longitudinal axis of the casing 6, as shown in Figure 2.

The casing 6, in its rear wall 32, is provided with an axial opening for receiving an externally threaded tube 33, placed in position in course of manufacture and either soldered or brazed in position, said tube passing through a bracket 34 and locked in a set position in said bracket by the provision of a lock nut 35. The arms 36 of the bracket 34 abut the rear face of the abutment 37, which latter may conveniently be the dash of a motor vehicle and is provided with an opening 38 for receiving the casing, and against the margin of which opening the flanged ring 15 engages. Thus the bracket 34 cooperates with the ring 15 to fixedly secure the indicator in the dash.

The tube 33 receives an internally threaded sleeve 39 which is externally knurled for convenience in adjusting same, said sleeve receiving a threaded nipple 40 which is fixedly connected to a flexible coiled wire conduit or casing 41 by soldering or the like, which latter is fixedly secured at its other end by soldering or the like to a part of the actuating device, as will presently appear. The cables 7 and 29 are connected by a link 42, as best seen in Figure 2, and which link lies in the tube 33. A knurled nut 41a serves to lock the sleeve subsequent to adjustment, said knurled nut being threaded on said nipple 40 and abutting the sleeve to prevent its rotation when necessary, said conduit 41 being, of course, non-rotatable. Adjustment is made by loosening the nut 41a, rotating the sleeve on the tube 33, and then rotating the nut into abutment with the sleeve 39 to lock the same. It cannot then accidentally rotate because the conduit 41 is fixed and the tube 33 is also fixed.

The actuating device, as previously pointed out, includes a float and a supporting means therefor, whereby the float may be properly disposed within a container of liquid such as the gasolene tank 8. Conveniently, the actuating mechanism comprises a bearing portion 43, fixedly secured to a closure plate 44, which latter is provided on its under face with a plate 45 having downturned tongues 46, which engage in complemental recesses 47 in an inwardly directed annular flange 48 formed integrally with the upstanding collar 49, which latter with said flange form the filling opening 50 of the tank 8. The supporting bracket 10 is fixedly secured at 51 to the plate 45 and the lower end of said bracket or support 10 is bent laterally at 52 to form a lower bearing for a vertical shaft 53, which latter is revolubly mounted in a bearing opening 54 provided in the bearing 43, as best shown in Figure 6.

The lower end of the shaft 53 carries a bevel gear 55, which latter meshes with a complemental gear 56 revolubly mounted on a shaft 57, carried on a depending extension 58 of the bracket 10. The float 9 is carried by an arm 59, which latter extends radially from the gear 56. The float 9 is preferably elongated and at about its medial portion connected to the end of the arm 59 by a swivel joint 60, so that the float may more readily assume a substantially horizontal position in the liquid contents of the tank that is, float evenly in the liquid regardless of angularity of the arm 59.

The closure plate 44 is secured on the collar 49 by the provision of a clamping ring 61 and a suitable packing 62 is interposed between the ring 61 and said plate.

The upper end of the shaft 53 carries a pinion 63 which meshes with a rack bar 64, which latter is arranged for longitudinal transverse displacement in a pocket or recess 65 formed in a transverse bearing portion 66, which latter, for convenience, is cast integrally with the bearing 43. A plate 67, secured by screws 68 to the bearing 43, prevents upward displacement of the shaft 53 and consequent disconnection of the rack and pinion.

The bearing 66 is provided with a complemental top portion 69, secured thereon by the provision of bolt 70, passing through complemental lugs formed on the bearing and on the top portion 69.

The rack bar is connected at 71 to the adjacent end of the cable 7 by soldering or the like, and the flexible conduit 41 is fixedly connected to a tube 72, which latter is provided with an annular flange 73 which seats in complemental recesses formed in the bearing 66 and the top member 69, thus holding the conduit 41 fixedly with relation to the actuating device and preventing any binding or other interference with the proper rectilinear movement of the cable.

The rack bar 64 is furthermore guided by the provision of a lug 74 which enters a groove 75 formed in the top plate 69, as best seen in Figure 6.

It will be observed that in operation the rise and fall of the float in the tank 8 will impart rotation to the shaft 53 through the gearing 11, and by virtue of such rotation cause a reciprocation of the rack bar 64, which in turn exerts a pull or slacks away on the cable 7, thus imparting partial rotation to the drum 28 and a consequent displacement of the indicating arm 16 on the scale.

It will be observed that the cable, due to the provision of the coil spring 25, is always maintained under tension, that is, the cable 7 is never slack, regardless of the position of the float or other elements, and the only time that the cable will be slack is in the event that some part of the device becomes broken. For instance, should the cable itself part, then the coil spring will return the arm 16 to zero and thus the observer will be apprised that either the tank is empty or that something is wrong with the apparatus. It will be observed, that the member 39 and its connection with the casing 41 and the connection of the latter to the tank is such that the apparatus is air-tight. Furthermore, the communicating means including the casing 41 between the indicator and the tank is susceptible of adjustment in length.

When first installing this device it is, of course, necessary that the indicator on the dash give the proper indication as to the level of the liquid in the tank 8, and in order to afford a convenient adjustment of the parts to the end that an accurate indication may always be had thereafter, the sleeve 39 may be rotated so as to vary the distance as measured by the conduit 41 between the actuating device and the indicator, and as it is preferable that this means be disposed where one installing the device may observe the indicator, I have shown the adjusting means as adjacent to the indicator. The facility with which this device may be installed, its usefulness, and the convenience with which adjustments may be made, will be readily appreciated by those skilled in the art. It will be observed that the tank 8 may readily be filled by removing the actuating device in its entirety and it will also be observed that this removal may be done without disturbing the accurate setting of the device.

I reserve the right to make obvious necessary minor alterations in the details, within the spirit and scope of the invention as claimed.

I claim:

1. In combination with an indicator, a float mechanism, and an actuating cable connecting said float mechanism and indicator, of a conduit enclosing said cable, and means for adjusting said conduit comprising a rotatable sleeve, nipples having threaded engagement with and extending from opposite ends of said sleeve and a lock nut on one of said nipples adapted to abut the end of said sleeve, said nipples being fixedly connected, respectively, to the indicator and conduit.

2. In combination with an indicator, a float mechanism, and an actuating cable connecting said float mechanism and indicator, of a conduit enclosing said cable, and means for adjusting said conduit comprising a rotatable sleeve, nipples carried, respectively, by the indicator and the conduit, said nipples being in threaded engagement with said sleeve, and a lock nut on one of said nipples abutting said sleeve to maintain the latter in an adjusted position.

3. In combination with an indicator, an actuating mechanism, and a cable connecting said actuating mechanism and indicator, of a conduit enclosing said cable, and means for adjusting said conduit comprising a rotatable sleeve, nipples carried respectively by the indicator and conduit, said nipples being in threaded engagement with said sleeve, and a lock nut on one of said nipples abutting said sleeve to maintain the latter in an adjusted position.

In testimony whereof I affix my signature at 36 W. Randolph St., Chicago, Illinois.

HANS LUNDQUIST.